US006318154B1

United States Patent
Povlacs et al.

(10) Patent No.: US 6,318,154 B1
(45) Date of Patent: Nov. 20, 2001

(54) APPARATUS AND METHOD FOR AUTOMATICALLY ELECTRONICALLY TESTING CONDOMS

(75) Inventors: Lawrence Povlacs, Dothan; William L. Gatewood; Phillip S. Wheeler, both of Slocomb; Joel P. Willis, Headland, all of AL (US)

(73) Assignee: LRC Products Ltd., Broxbourne ( * ) Notice: Subject to any disclaimer, the term of this patent is extended or adjusted under 35 U.S.C. 154(b) by 0 days.

(21) Appl. No.: 09/463,837

(22) PCT Filed: Jul. 31, 1998

(86) PCT No.: PCT/US98/16035

§ 371 Date: May 1, 2000

§ 102(e) Date: May 1, 2000

(87) PCT Pub. No.: WO99/06810

PCT Pub. Date: Feb. 11, 1999

Related U.S. Application Data

(60) Provisional application No. 60/054,481, filed on Aug. 1, 1997.

(51) Int. Cl.[7] .................................................. G01M 3/04
(52) U.S. Cl. ............................................................ 73/40
(58) Field of Search .................................. 414/676, 755; 406/87; 209/543, 572, 906; 324/557; 73/40; 53/117; 29/235; 425/438

(56) References Cited

U.S. PATENT DOCUMENTS

| 2,293,290 | * | 8/1942 | Gammeter | 214/1 |
|---|---|---|---|---|
| 2,320,516 | * | 6/1943 | Gammeter | 209/81 |
| 2,371,818 | * | 3/1945 | Gammeter | 18/2 |
| 2,503,803 | * | 4/1950 | Cremer et al. | 209/81 |
| 2,609,094 | * | 9/1952 | Fry | 209/10 |
| 2,622,129 | * | 12/1952 | Killian | 175/183 |
| 2,649,960 | * | 8/1953 | Gammeter | 209/81 |
| 2,714,451 | * | 8/1955 | Gammeter | 209/74 |
| 2,771,190 | * | 11/1956 | Gammeter | 209/74 |
| 3,391,803 | * | 7/1968 | Povlacs | 214/1 |
| 3,588,997 | * | 6/1971 | Field | 29/450 |
| 3,756,402 | * | 9/1973 | Wagers, Jr. et al. | 209/73 |
| 4,144,970 | * | 3/1979 | McKnight et al. | 198/480 X |
| 4,607,474 | * | 8/1986 | Jarvis | 53/117 |
| 5,499,898 | * | 3/1996 | Vonier et al. | 414/755 |
| 6,044,693 | * | 4/2000 | Sisbarro et al. | 73/41 |
| 6,160,406 | * | 12/2000 | Underwood et al. | 324/558 |
| 6,164,122 | * | 12/2000 | Sisbarro et al. | 73/45 |

* cited by examiner

Primary Examiner—Hezron Williams
Assistant Examiner—Charles D. Garber
(74) Attorney, Agent, or Firm—Darby & Darby

(57) ABSTRACT

An apparatus for automatically electronically testing condom includes an inflation tub (12) that has an internal chamber for housing a plurality of floating condoms (24). A jug assembly (16) has a plurality of jugs. Each of the jugs (68) is mounted on a rotating mounting plate (72) and receives a condom (24) from the inflation tub by employment of a plurality of pick-up tubes (56) as mounted on a rotating disc (60) driven by a rotating shaft (58). A mandrel assembly (18) has a plurality of mandrels which are loaded with condoms after the plurality of jugs is loaded by vacuum suction force from loading tube (64) mounted on a rotating front turret plate (66). Each of the mandrels receives a condom from one of the jugs to electronically test the condom on a test drum roller (not shown), thereby permitting separation of acceptable condom articles from failed condom articles in terms of ability to insulate an applied voltage at test drum roller.

29 Claims, 14 Drawing Sheets

APPARATUS AND METHOD FOR AUTOMATICALLY ELECTRONICALLY TESTING CONDOMS

This application claims benefit of Provisional Application Ser. No. 60/054,481 filed May 1, 1997.

BACKGROUND OF THE INVENTION

1. Field of the Invention

The present invention relates to an apparatus and method for testing condoms. More specifically, the present invention relates to an apparatus and method for automatically electronically testing condoms.

2. Discussion of the Related Art

Conventionally, condoms are electronically tested by manually placing a condom on one of a plurality of mandrels. Approximately 10–20 mandrels are disposed on the outer periphery of a rotating wheel. Each mandrel is rotatably mounted on the wheel so that the mandrel may rotate about its longitudinal axis. As the wheel rotates, the condom loaded mandrel passes by a contoured plate having conductive foam attached thereto that electronically determines whether there are any holes in the condom in a manner that is known in the art. This plate is known in the art as a test net. As the mandrel passes by the plate, the mandrel rotates about its longitudinal axis about 1½ to 2 revolutions. Thereafter, the condom is rolled off the mandrel and placed in either a good product bin or a bad product bin depending upon the results of the electronic test.

This conventional apparatus, which includes manually loading the condoms on the mandrels, can only test about 45 condoms per minute and typically operates at an efficiency of between 95 and 100%. Efficiency refers to the percentage of time that a condom has been properly loaded on the mandrel. The apparatus, in accordance with the present invention, tests about 330 condoms per minute at an efficiency of between 80 and 85%. Accordingly, the present invention tests about seven (7) times the number of condoms than the conventional apparatus during any given period of time. While the efficiency of the prior art manner of testing condoms is relatively high, the total number of condoms that can be tested is relatively low. Additionally, because the condoms are manually loaded on the mandrel, the prior art manner of testing condoms is quite labor intensive.

Accordingly, it is an object of the present invention to provide an apparatus that automatically loads condoms on a mandrel so that they may be electronically tested. It is a further object of the present invention to provide an apparatus that can automatically process a relatively large number of condoms.

SUMMARY OF THE INVENTION

In accordance with a preferred embodiment of the present invention, the above object is achieved with an apparatus that includes an inflation tub that has an internal chamber for housing a plurality of condoms. A jug assembly has a plurality of jugs. Each of the jugs receives a condom from the inflation tub. A mandrel assembly has a plurality of mandrels. Each of the mandrels receives a condom from one of the jugs to electronically test the condom.

BRIEF DESCRIPTION OF THE DRAWING FIGURES

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein.

DETAILED DESCRIPTION OF THE PREFERRED EMBODIMENT

Figure 1:
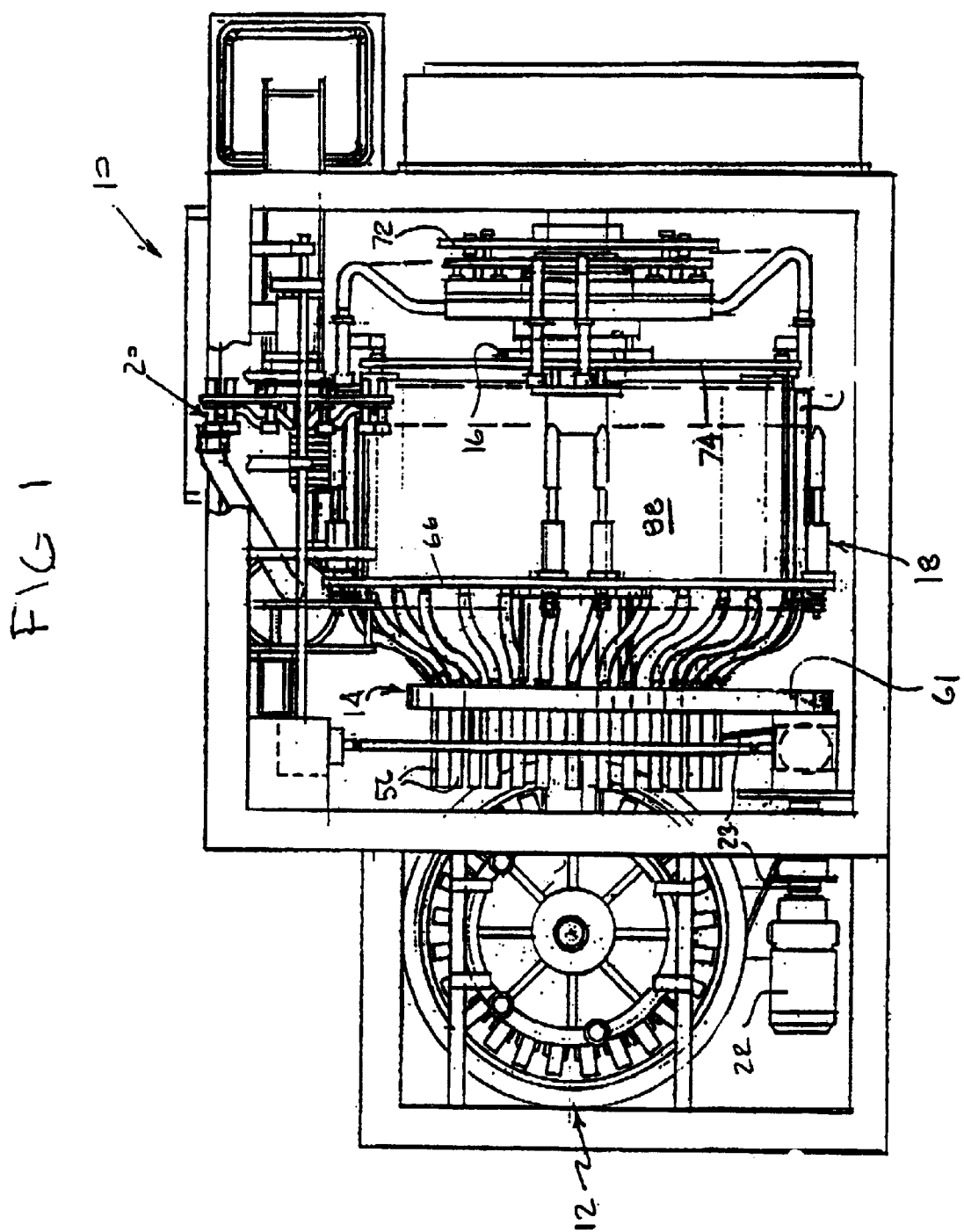
FIG. 1 is a top plan view of the apparatus for automatically electronically testing condoms in accordance with present invention.

Referring now to FIG. 1, an apparatus 10 for automatically electronically testing condoms is illustrated. The apparatus includes an inflation tub 12, a turret assembly 14, a jug assembly 16, a mandrel assembly 18 and a sorter 20.

A single motor 22 preferably rotatably drives inflation tub 12, turret assembly 14 and sorter 20 so that each of these devices rotate in synchronism with respect to each other. Each of the drives are preferably effected by a belt drive connection. Of course, however, other types of drive connections, such as, for example, a gear drive may be utilized. Additionally, separate motors, whose rotation is synchronized, may also be used.

Figure 2:
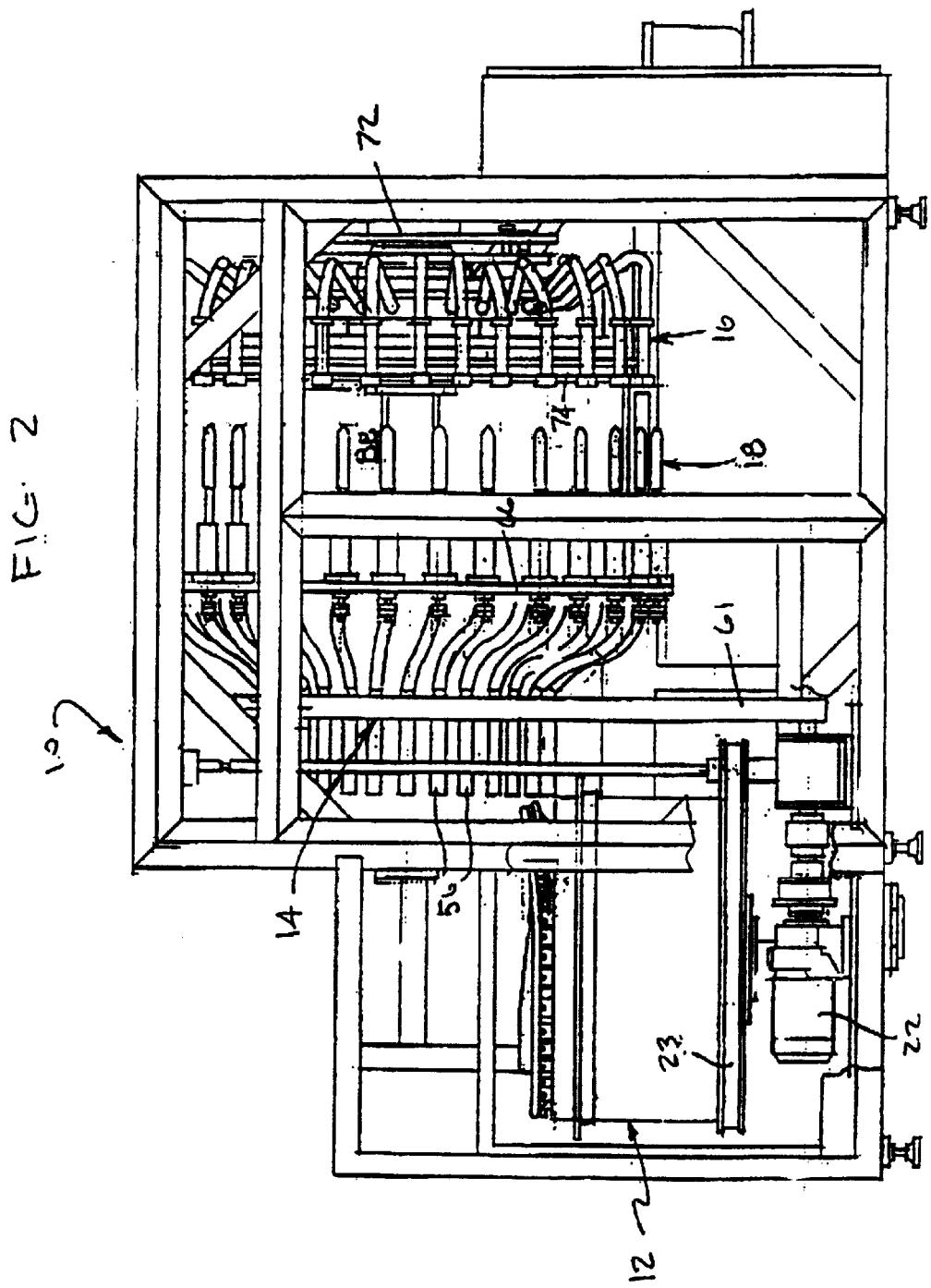
FIG. 2 is a front view of the apparatus.
Figure 3:
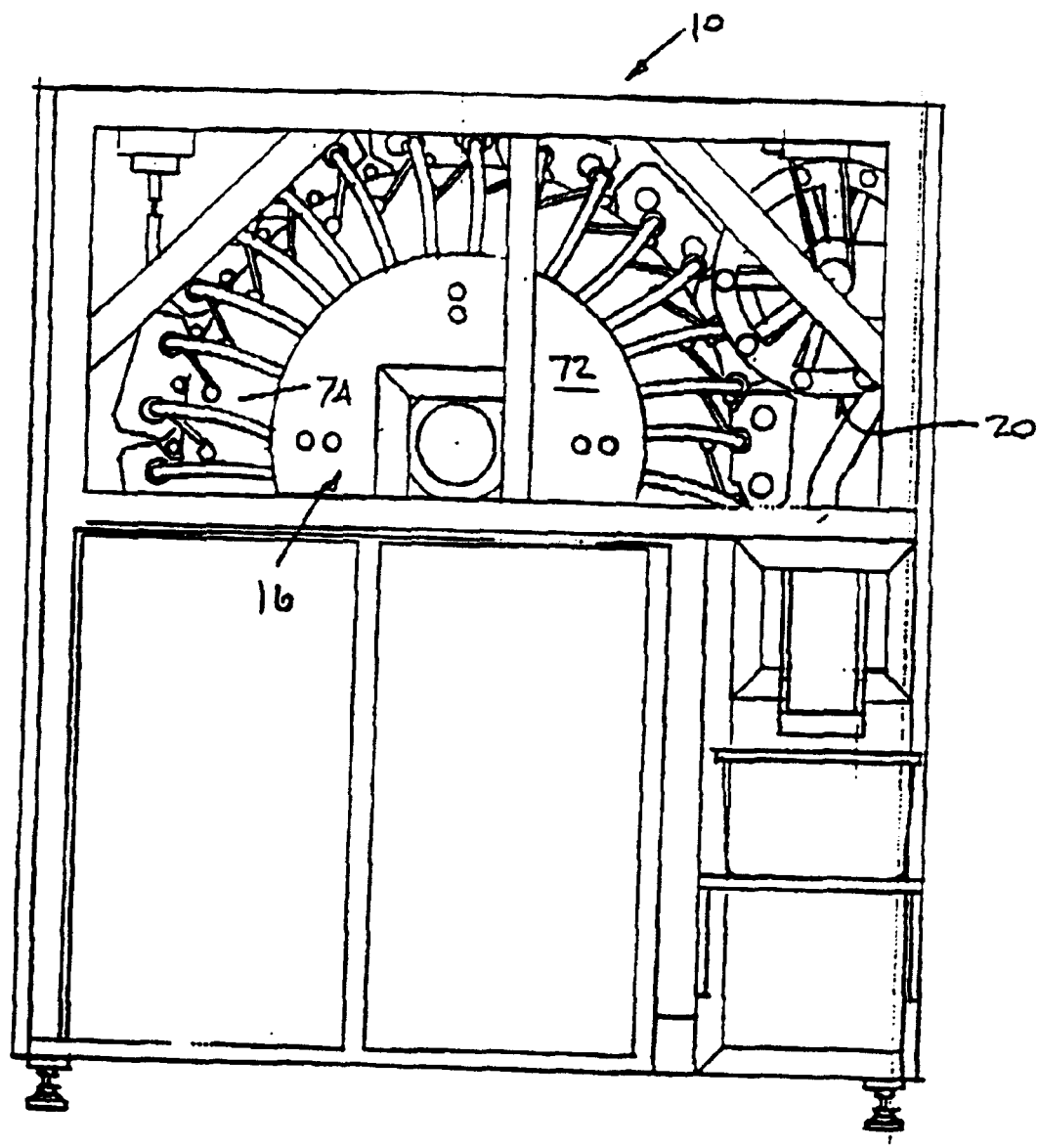
FIG. 3 is a right side view of the apparatus.
Figure 4:
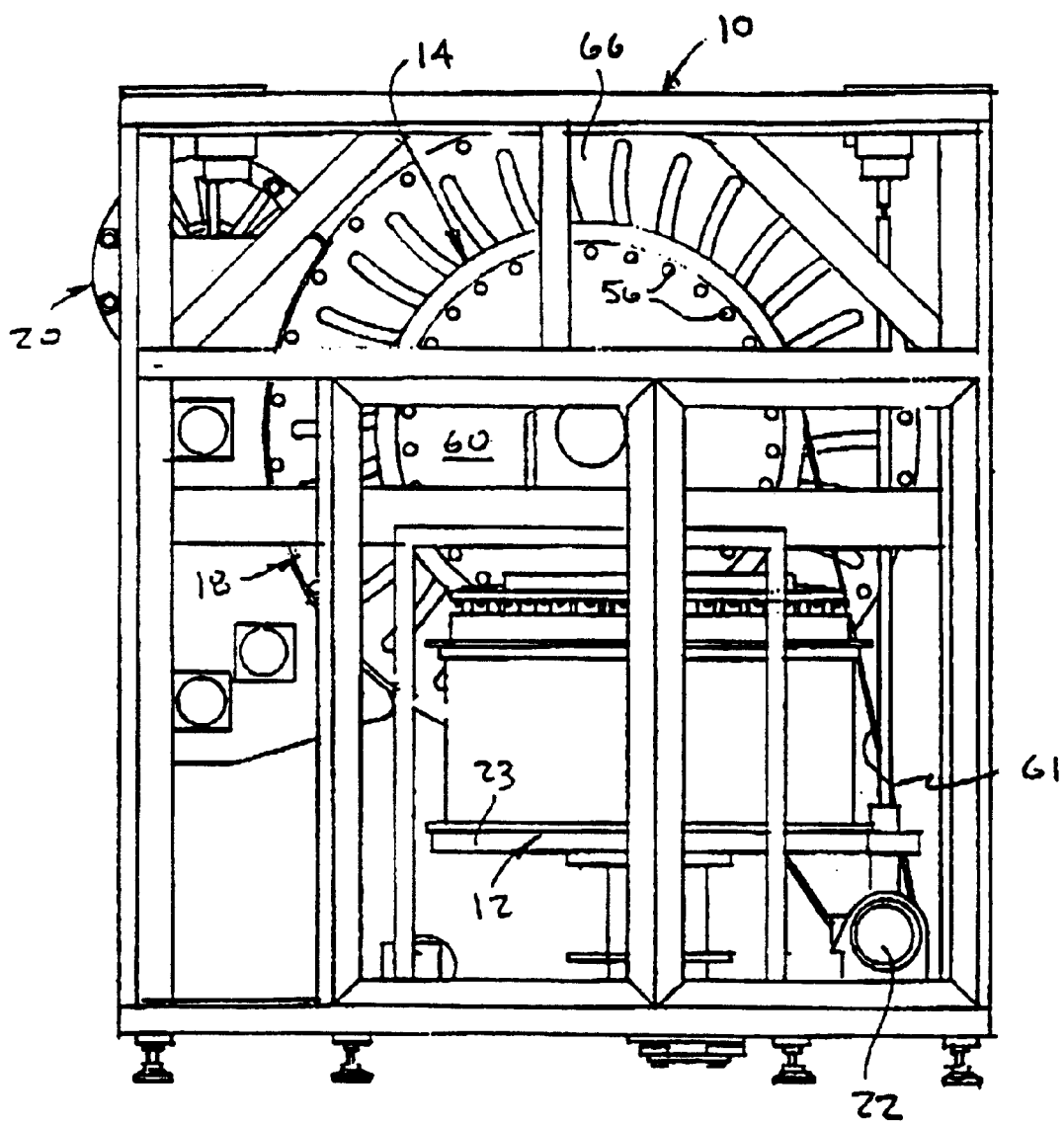
FIG. 4 is a left side view of the apparatus.
Figure 5:
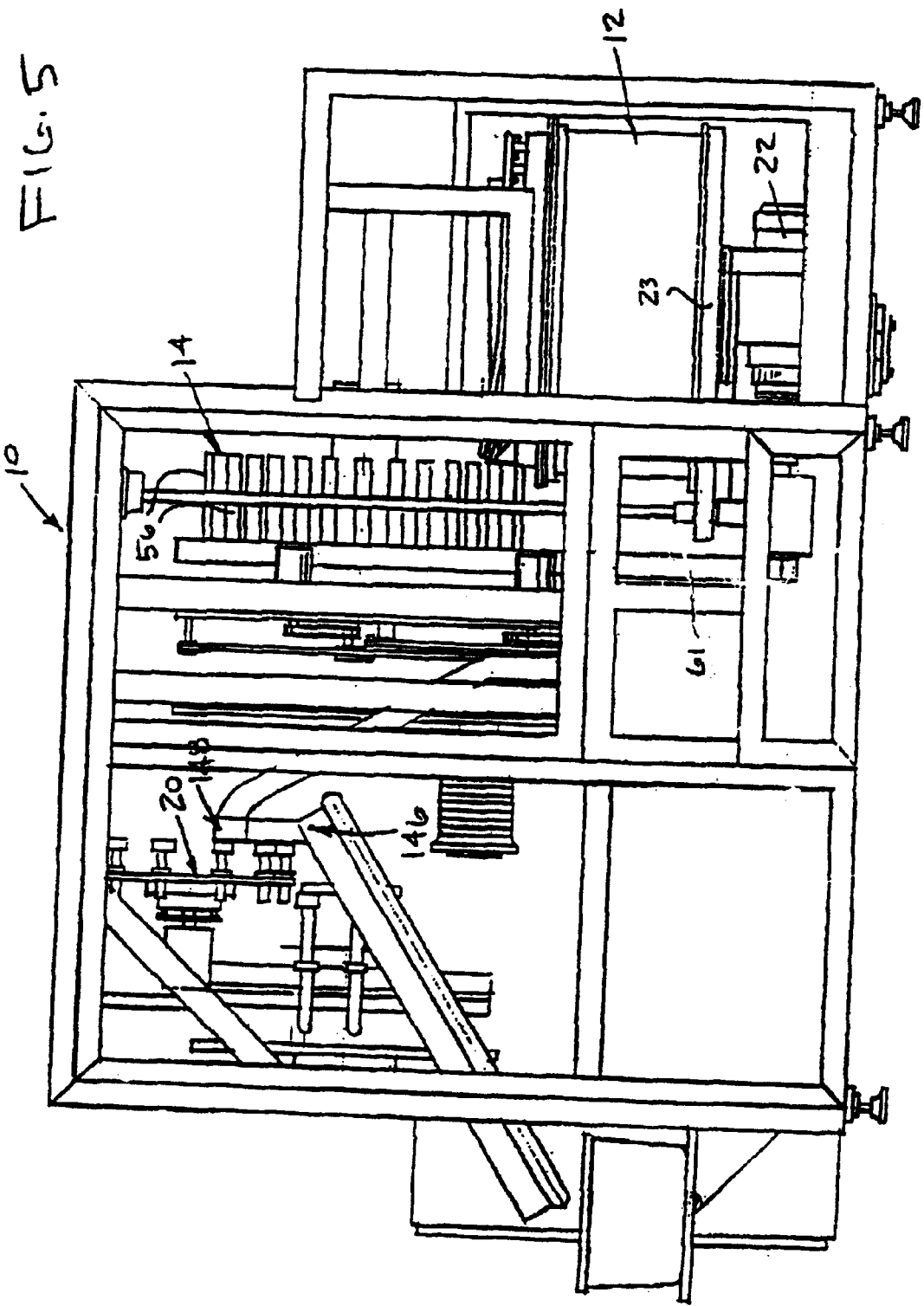
FIG. 5 is a rear view of the apparatus.
Figure 6:
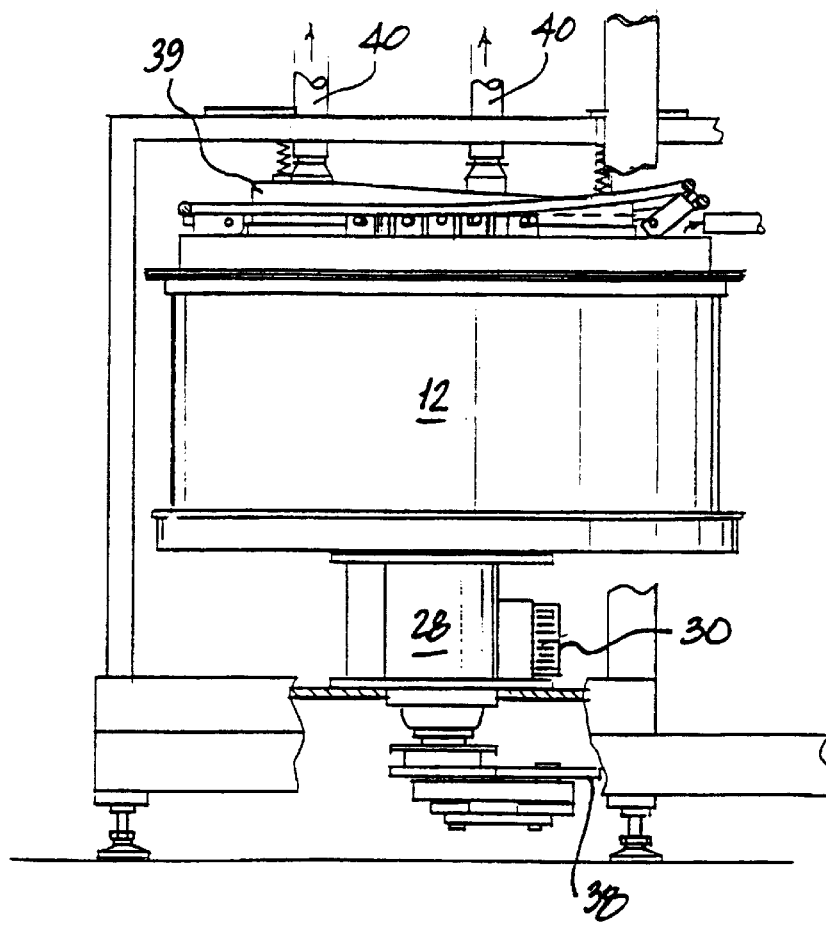
FIG. 6 is a front view of the inflation tub.
Figure 7:
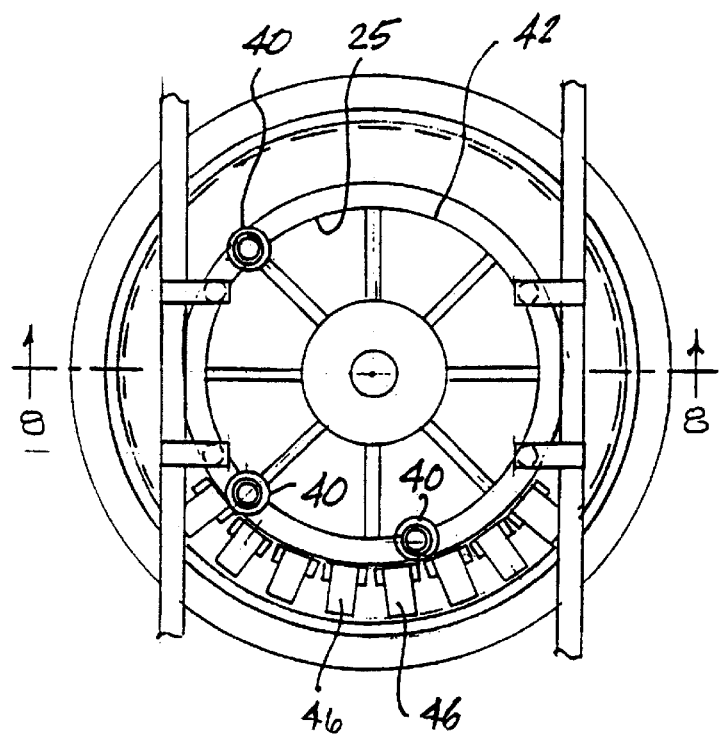
FIG. 7 is a top plan view of the inflation tub.

Referring now to FIGS. 6–9, inflation tub 12 is illustrated in greater detail. Inflation tub 12 includes a housing 13 that defines an internal chamber 26. Inflation tub 12 is rotatably driven by motor 22 via belt drive 23 (see FIG. 2). Inflation tub 12 periodically receives a sufficient supply of condoms 24 through an opening 25 into internal chamber 26. Condoms 24 are non-destructively agitated within chamber 26 due to the circulation of air or other fluid through central shaft 28. The air enters fixed shaft 28 through an inlet 30 (see FIG. 6) and exits from the shaft into chamber 26 through a plurality of openings 32. A plate 34 is perforated to permit the air to flow up through the plate. The size of the perforations in plate 34 are such that the condoms cannot fall below plate 34. A rotating agitator 36 is disposed within chamber 26. Agitator 36 is rotatably driven by a reversible motor mechanism 38, in a manner known to those skilled in the art. Agitator 36 alternatively rotates in opposite directions (similar to a washing machine agitator) or may rotate continuously in one direction. The air entering chamber 26 from shaft 28, creates an air flow within chamber 26 that generally flows from the lower portion thereof to the upper portion thereof. Thus, chamber 26 acts as a fluidized bed to maintain the condoms in a floating state, and generally moving upwardly. However, the flow of air is not so great as to cause condoms 24 disposed in chamber 26 from flowing out of chamber 26 through upper opening 25. Agitator 36 ensures that the condoms do not bunch together.

Figure 8:
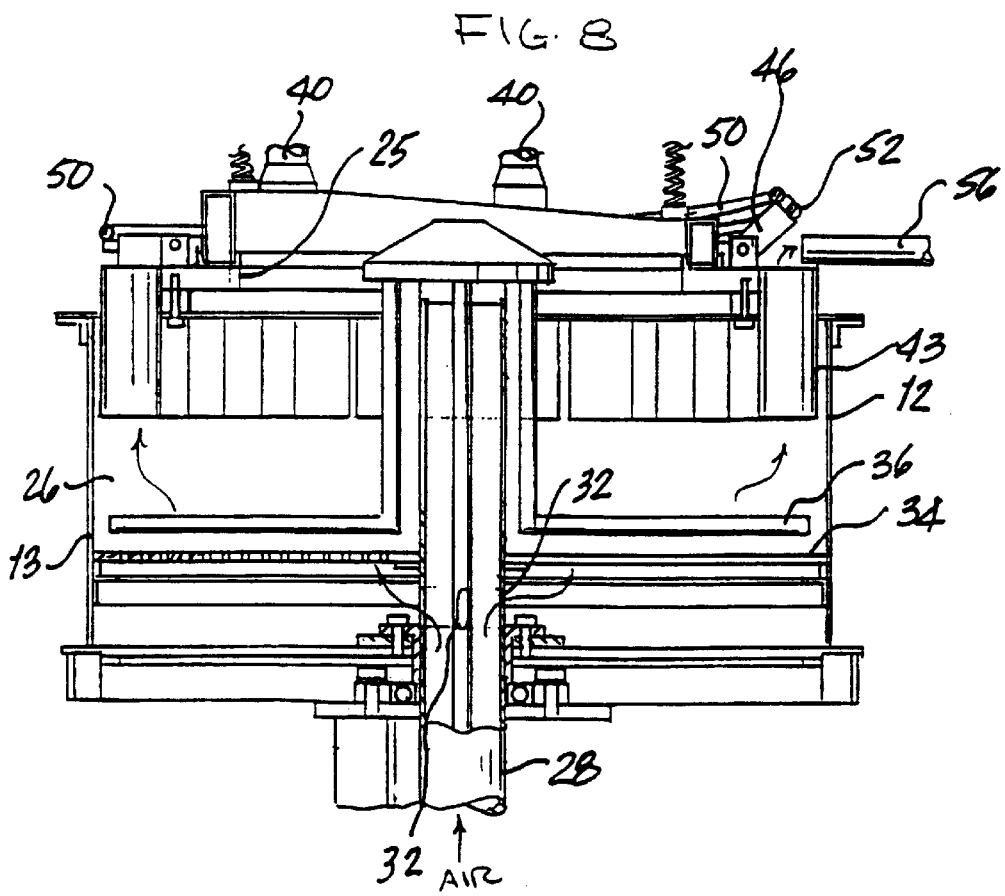
FIG. 8 is a cross-sectional view taken along line 8—8 of FIG. 7 and looking in the direction of the arrows.
Figure 9:
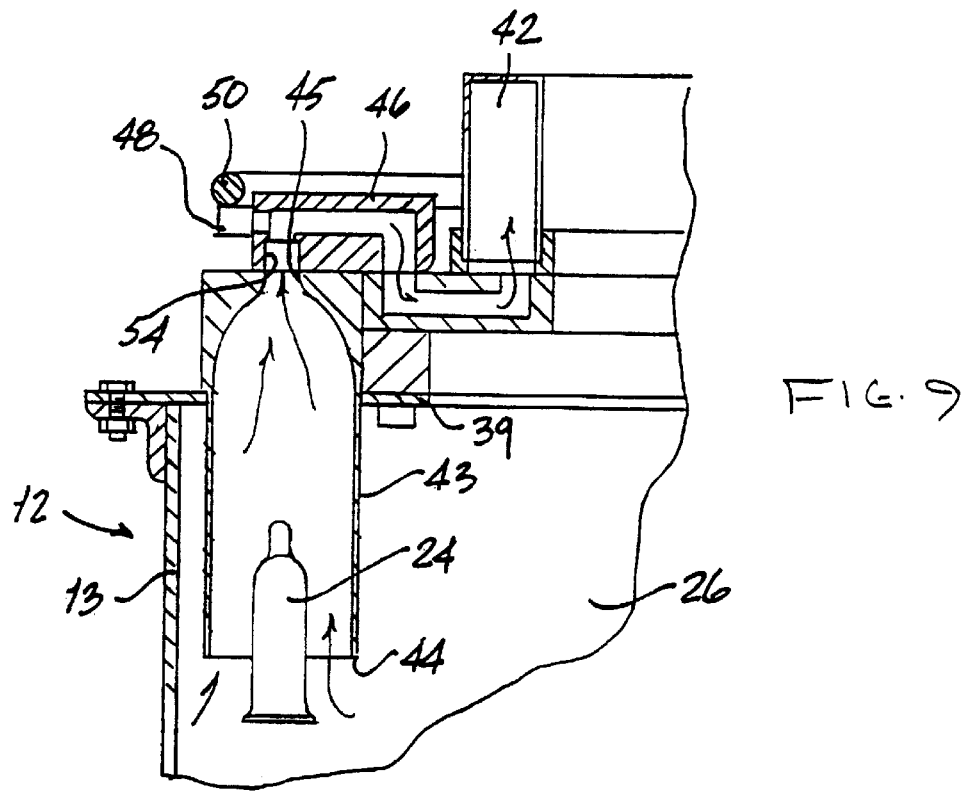
FIG. 9 is an enlarged partial sectional view of the condom receiving cylinder of the inflation tub.

A plurality of vacuum ports 40 are fluidly connected to a fixed vacuum ring 42 that is disposed atop of an upper wall 39 of housing 13 (see FIGS. 8 and 9). Vacuum ring 42 is fluidly connected to a plurality of condom receiving cylinders 43, which are partially disposed within chamber 26. Cylinders 43 have an open bottom end 44 so that they may receive a condom 24 floating within chamber 26. Cylinders 43 are rotatably driven along with housing 13 with respect to fixed vacuum ring 42. A rotating pivoting block 46 is connected to upper wall 39 of housing 13. Each block 46 rotates at the same speed as housing 13. There is one block 46 for every cylinder 43.

The internal surface of cylinder 43 gradually tapers at the top to a small diameter opening 45. The shape of the internal surface of cylinder 43 is similar to the shape of a soda bottle. Block 46 includes a relatively narrow opening 54, which is approximately the same size as opening 45, that fluidly communicates with vacuum ring 42, and, when block 46 is in the position illustrated in FIG. 9, fluidly communicates with chamber 26 via opening 45 in cylinder 43. Block 46 includes an outer projecting cam 30 follower 48 that rides under a fixed cam 50, which forms a complete 360° circumference thereby defining an upper limit position for block 46. For a portion of its 360° rotation, cam follower 48 rides over a bottom fixed cam 52. Bottom fixed cam 52 causes block 46 to pivot up and away from upper surface 53 of cylinder 43. In most cases, by the time block 46 rotates to the unload position, a condom 24 will be received at the upper portion of cylinder 43 and trapped, due to the suction force applied by the vacuum in vacuum ring 42, at the narrow opening 54 in pivoting block 46. Thus, when block 46 is pivoted upwardly into the unload position, as illustrated in the upper right hand portion of FIG. 8, the tip of condom 24 is lifted out of cylinder 43 due to the vacuum holding force applied by vacuum ring 42. At the same time, a condom pick up tube 56 is rotating about a central shaft 58 and aligns with the open space created between the upwardly pivoted block 46 and the upper surface 53 of cylinder 43. Because the suction force applied by tube 56 is relatively stronger than the suction force applied by the vacuum in vacuum ring 42, the condom is transferred from block 46 and cylinder 43 into pick up tube 56.

Figure 10:
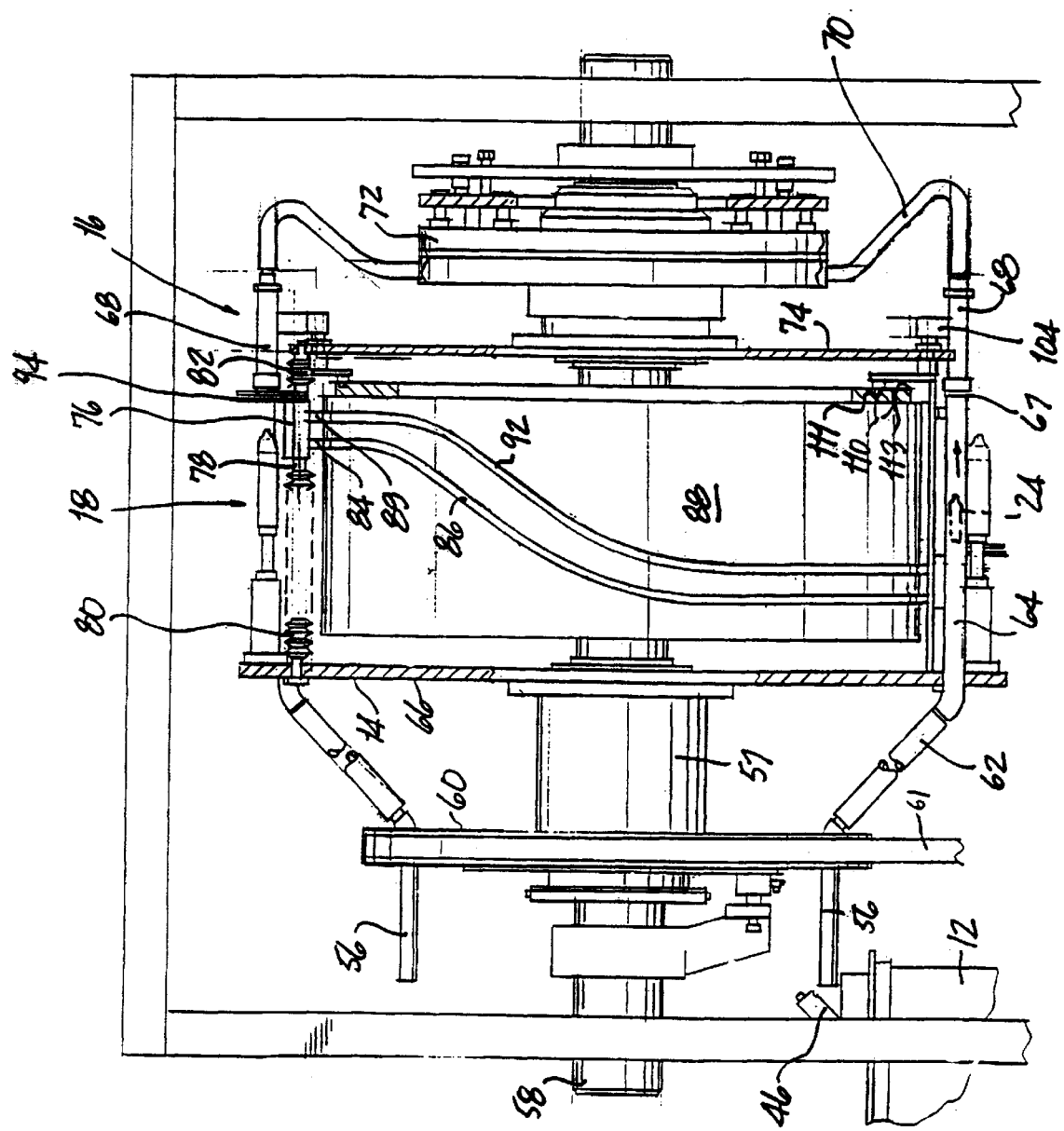
FIG. 10 is a partial, front view of the apparatus, with parts broken away.
Figure 12:
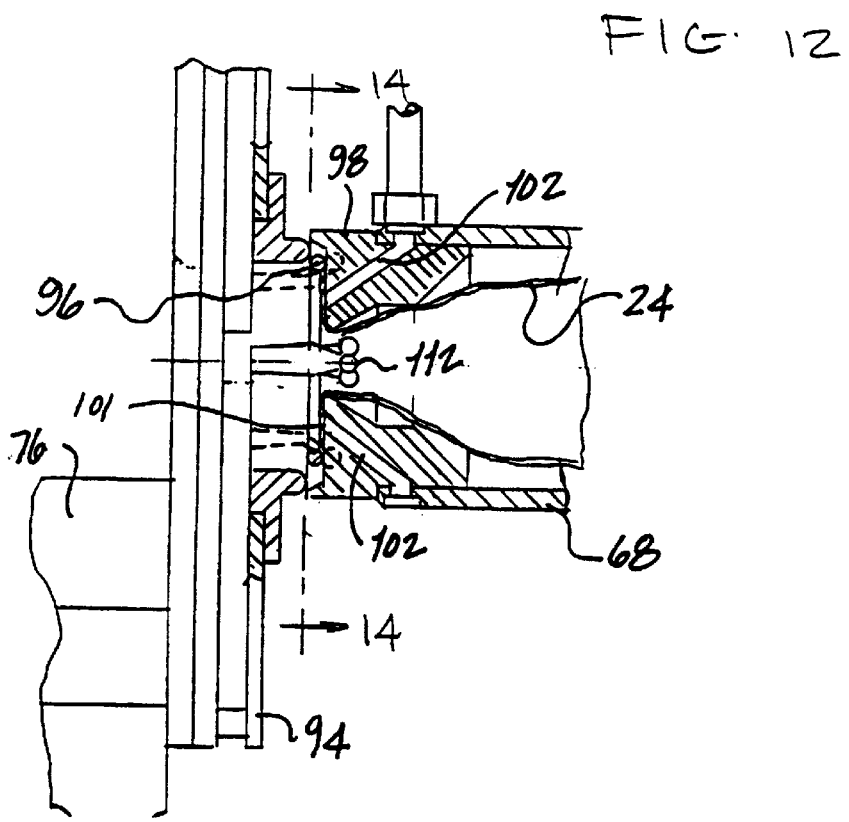
FIG. 12 is an enlarged partial front view of a portion of the jug assembly and the finger assembly.
Figure 13:
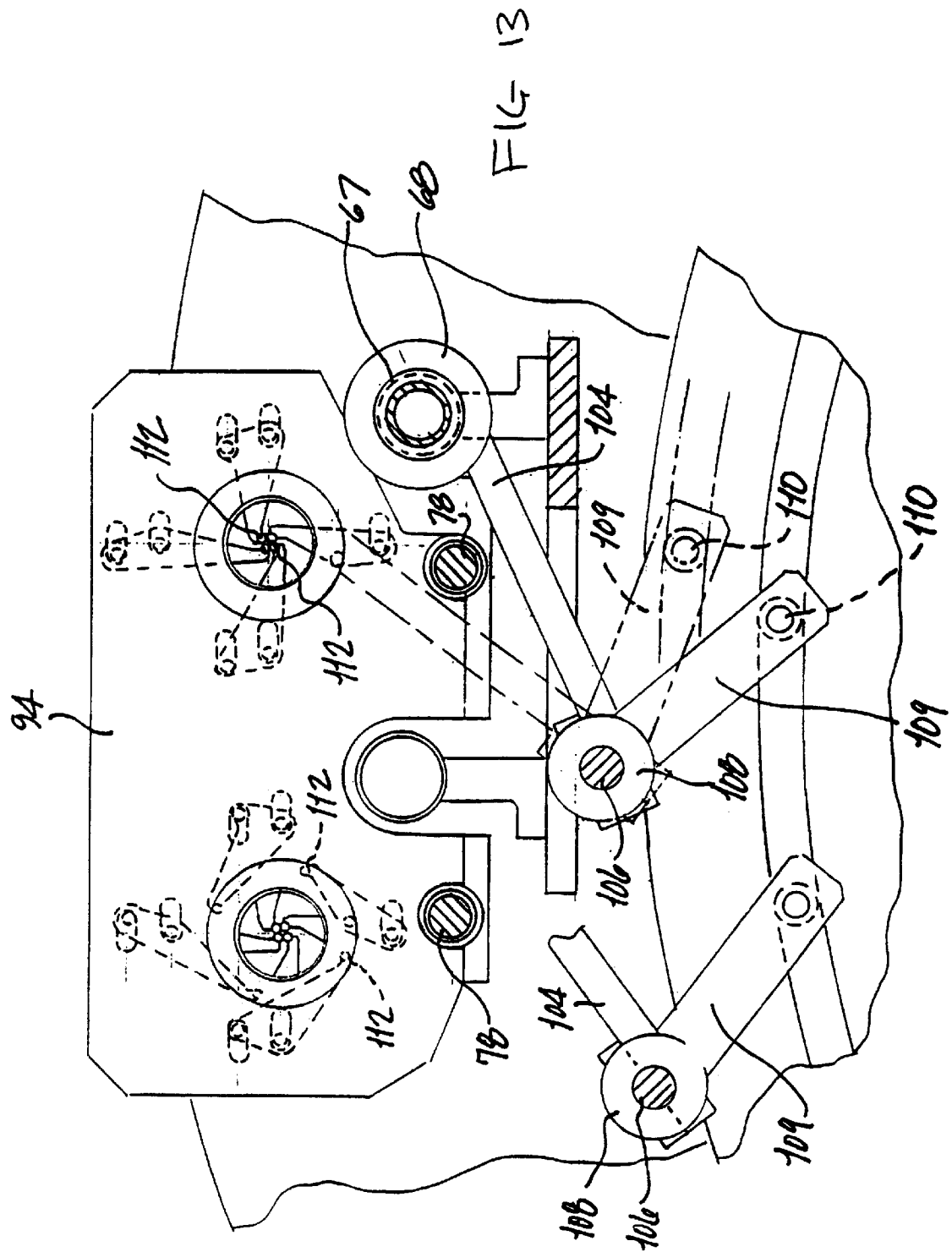
FIG. 13 is a side view of the slide block assembly, including the finger holder assembly, and also shows the two positions of the jugs.

The plurality of pick up tubes 56 rotate about a fixed central shaft 58 (See FIG. 10). There is one pick up tube 56 for every cylinder 43. Tubes 56 are fixedly connected to a disk 60 that is mounted on a sleeve 57 that rotates about shaft 58. Each pick up tube 56 is connected, by a flexible tube 62, to a loading tube 64. Loading tubes 64 are fixedly connected to a front turret plate 66, which is also connected to sleeve 57 and rotatably driven about shaft 58. Thus, plate 66 and disk 60 rotate about shaft 58 at the same speed. Disk 60 is rotatably driven by motor 22 via belt drive 61 (see FIGS. 2 and 10). Each loading tube 64 has an open end 67. Open end 67 of loading tube 64 is aligned with one of a plurality of jugs 68, when the jug is pivoted into the loading position. Each loading tube 64 is also supported by a front mounting bracket 65. Each bracket 65 supports two loading tubes 64 (see FIG. 13). Bracket 65 is fixedly mounted on a rotating mounting disk 74. Each jug 68 is connected, via vacuum line 70, to a rotating mounting plate 72. Vacuum line 70 is the source of the suction force applied by pick up tube 56. Each jug 68 is pivotably connected to a rotating mounting disk 74. Both plate 72 and disk 74 rotate about central shaft 58 at the same speed as disk 60 and plate 66. Each jug 68 pivots between a loading position, as illustrated in FIGS. 10, 11 and FIG. 13 (in phantom), and a transport position as illustrated in FIGS. 12, 13 (in solid lines) and 14.

Each jug 68 is fixedly connected to an arm 104. Arm 104 is fixedly connected to a shaft 106, which is fixedly connected to housing 108. Shaft 106 extends through mounting disk 74 and is rotatably connected to disk 74. A cam 110 is fixedly connected to housing 108 by a connecting arm 109, thereby permitting jug assembly 69 to pivot between the loading position and the transport position depending upon the position of cam 110 within a cam groove 111 that is disposed on an axial end face 113 of a fixed cam drum 88.

A plurality of shafts 78 are mounted between rotating plate 66 and rotating disk 74. There is one shaft 78 for each cylinder 43. A plurality of slide blocks 76 are each axially slidably mounted on two shafts 78. A first bellows tube 80 is connected about each shaft 78 between plate 66 and slide block 76. A second bellows tube 82 is mounted about each shaft 78 between slide block 76 and disk 74. Thus, the bellows tubes prevents any stray pieces of debris from coming in contact with shaft 78, which may interrupt the sliding movement of slide block 76. Slide block 76 includes a first cam follower 84 fixedly mounted thereto, which rides in a cam groove 86 in the circumferential surface of fixed drum 88. Thus, as plate 66 and disk 74 rotate, each slide block 76 moves along the shaft 78 depending upon the position of its respective cam follower 84 within groove 86. A second cam follower 89 depends downwardly from slide block 76. Cam follower 89 rides in a second groove 92 in the circumferential surface of fixed cam drum 88. A finger assembly housing 94 is fixedly connected to each cam block 76.

Figure 11:
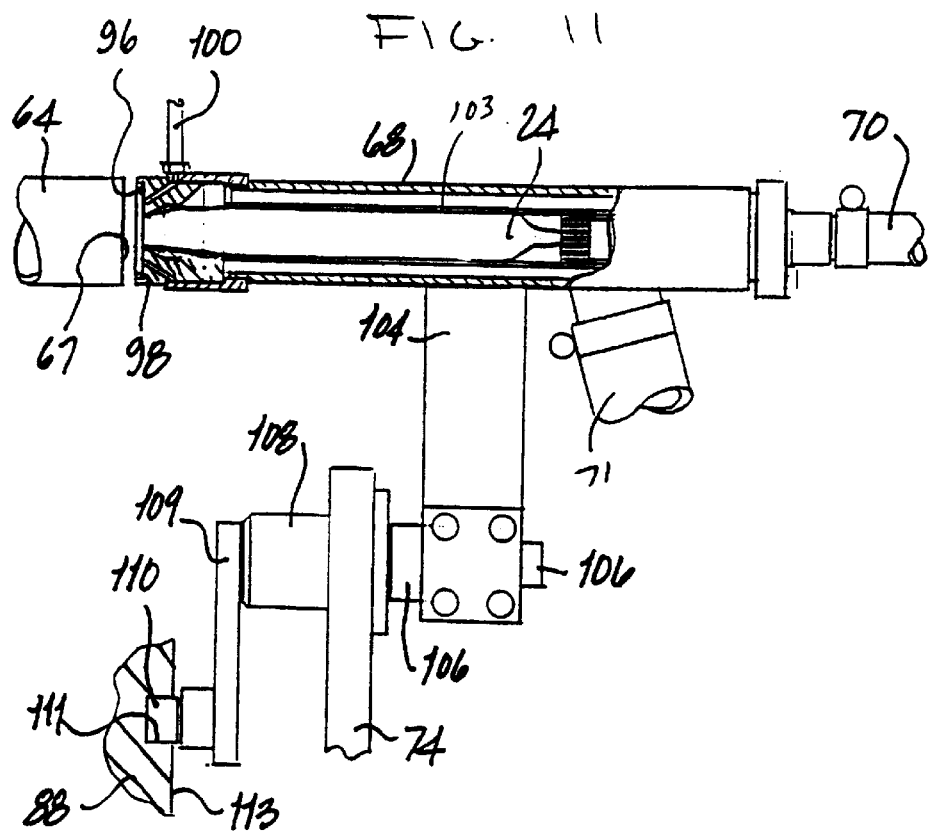
FIG. 11 is a front view of the jug, with parts broken away.

When a condom 24 is received within jug 68 from loading tube 64, the jug is in the loading position (see FIG. 11). The ring 96 of condom 24 is received at a first end cap 98 of jug 68. Condom 24 is drawn against a front end face 101 of end cap 98 by a vacuum that is supplied from conduit 71. However, condom 24 is haphazardly bunched-up against the axial front end face 101. End face 101 has a crosshair shaped opening 99, which prevents the ring 96 of condom 24 from entering the jug 68. A second conduit 100 is connected to the first end cap 98 of jug 68. Conduit 100 fluidly connects to four fluid ports 102 to blow air in against the bunched-up condom 24. The air flow from conduit 100 is sufficient to partially overcome the vacuum from conduit 71, thereby causing condom ring 96 to move back into the tube 64 to a position where the condom is elongated. The tip end of condom 24 is still retained against axial end face 101 due to the vacuum from conduit 71. The condom 24 is now ready to be moved into jug 68, tip end first, as illustrated in FIG. 11. Once condom 24 has been elongated, a vacuum is applied to an inner tube 103 of jug 68, via conduit 70, thereby causing condom 24 to move into the jug and the condom ring 96 to be properly seated on the axial end face 101 of end cap 98.

Figure 14:
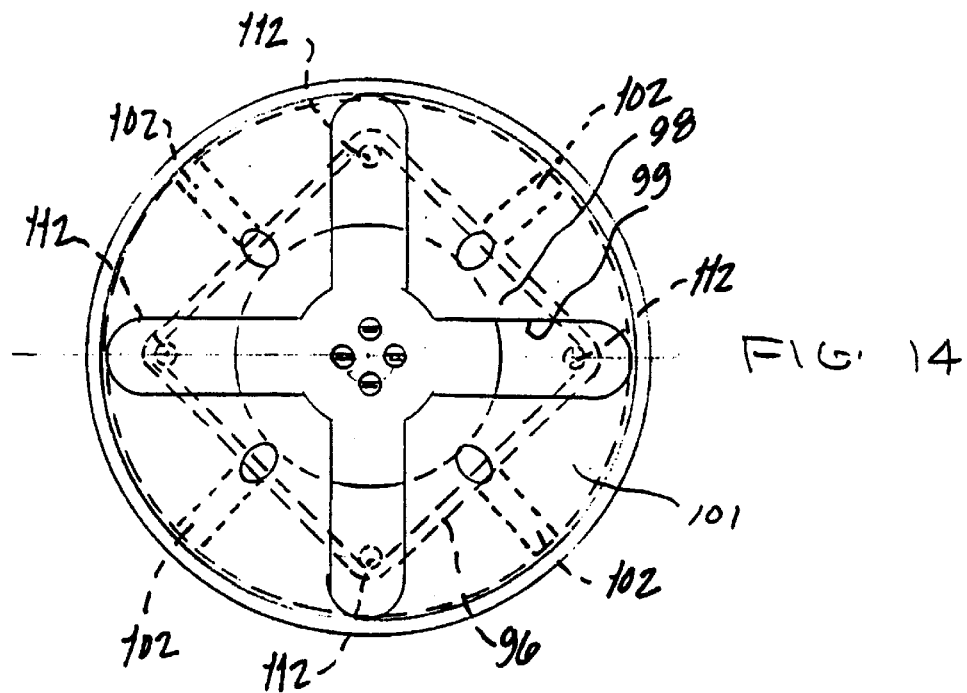
FIG. 14 is a cross-sectional view taken along line 14—14 of FIG. 12 and looking in the direction of the arrows.
Figure 15:
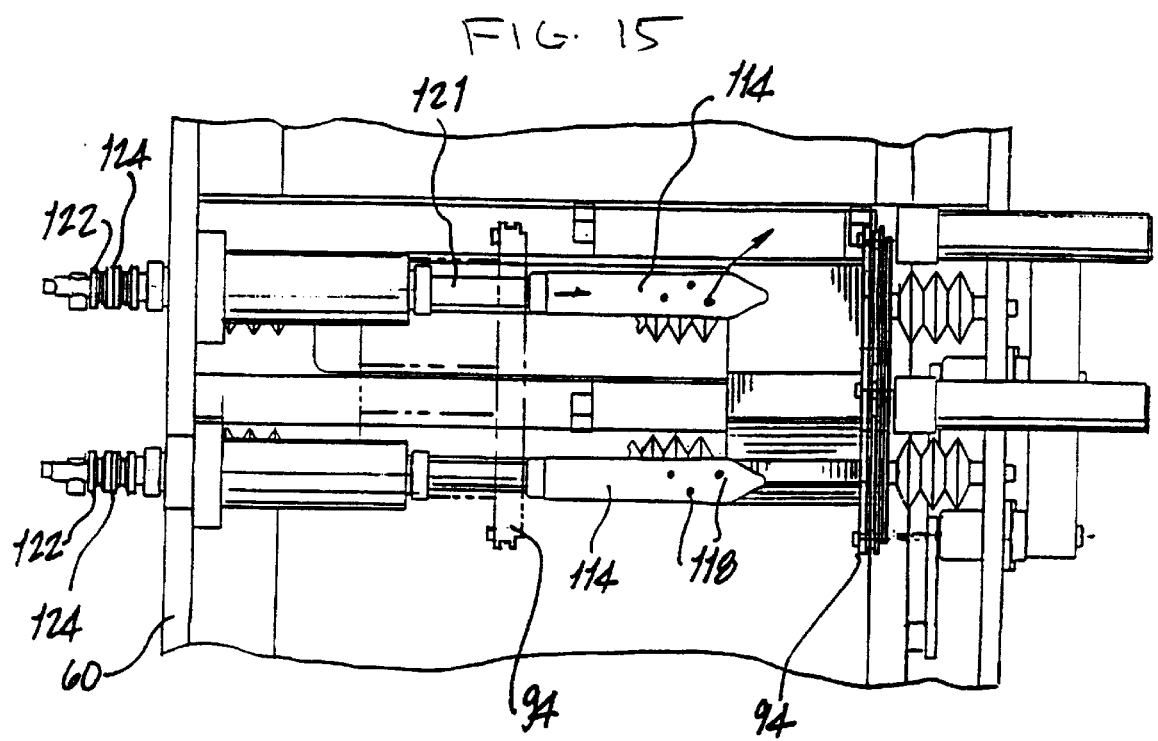
FIG. 15 is a partial top view of the jug assembly, slide block assembly and the mandrels.

As illustrated in FIG. 13, after the condom has been received in jug 68 (i.e., loaded in the jug), the jug 68 is pivoted from the loading position (solid lines) to the unloading position (phantom lines). Substantially simultaneously, the finger assembly housing 94 is axially moved adjacent to the first axial end cap 98 of the jug 68 into a condom ring engaging position (see FIGS. 12 and 14). The fingers are first disposed in a disengaged position, as illustrated in solid lines in FIGS. 12 and 13. Fingers 112 are simultaneously moved radially outwardly into the engaged position as illustrated in phantom in FIGS. 12 and 13. The radial position of fingers 112 is determined by the location of cam 89 within groove 92 (See FIG. 10). When actuated, fingers 112 move radially outwardly within the crosshair opening 99, thereby tightly engaging the condom ring 96, as illustrated in FIG. 14. The cam block 76 is then axially moved away from jug 68, thereby loading the condom 24 onto a mandrel 114. As illustrated in FIG. 13, housing 94 houses two sets of finger assemblies 112. Thus, two condoms 24 are drawn onto two adjacent mandrels 114 by housing 94 (See FIGS. 13 and 15). As the condom 24 is being loaded onto the mandrel 114, air is blown into the mandrel 114 and out of the mandrel through a plurality of openings 118, thereby facilitating the placement of condom 24 onto mandrel 114. Referring to FIG. 15, the finger housing 94 is illustrated in the mandrel loaded position (in phantom) and in the condom ring engaging position (in solid). Once housing 94 is in the mandrel loaded position, fingers 112 move radially inwardly (i.e., to a condom ring disengaged position) thereby disengaging the fingers 112 from condom ring 96 and placing the condom 24, including ring 96, on mandrel 114.

Condom 24 is now properly loaded on mandrel 114. The mandrel assembly 18 now rotates to a test roller 120. Test roller 120 is used to electronically determine whether there are any holes in condom 24, in a manner that is known in the art. Referring now to FIG. 15, each mandrel 114 is rotatably connected to plate 66. The mandrel shaft 121 extends through plate 66 and is fixedly connected to a first pulley 122 and a second pulley 124. Pulley 122 is selectively engaged by a belt 126 to rotatably drive mandrel 114 about its longitudinal axis when passing by test roll 120. A second belt 128 selectively engages pulley 124 to rotatably drive mandrel 114 about its longitudinal axis as the mandrel is passing by the take-off rollers 132, 136. The mandrel 114, which has a condom 24 placed about it, passes by test roller 120 while the mandrel shaft 121 is rotating and drum 120 is rotating in response to being driven by a motor 130. The circumferential speed of test roller 120 and mandrel 114 are set so that there is substantially no relative movement between the outer surface of the mandrel and the outer surface of the test roller. Typically, 1200 volts is allied to the test roller. Because the condom is an insulator, only a trickle voltage will be seen by the mandrel if the condom is intact (i.e., there are no holes in the condom). For example, for a latex condom, if the voltage seen by the mandrel is below 1.0 volts, then the condom is determined to be acceptable (i.e., good product). If there are any breaches in the condom, then a greater voltage will be seen by the mandrel. For example, if the voltage seen by the mandrel is greater than 1.0 volts, then the condom is determined to have a breach (i.e., bad product). If the voltage is greater than 4.5 volts, it is assumed that the mandrel is empty and has not been loaded with a condom or has been improperly loaded with a condom that may be a good product (i.e., a misfire). Each mandrel 114 preferably rotates by at least two complete revolutions as it passes by test roller 120, thereby assuring that the condom is completely tested by the test drum.

Figure 16:
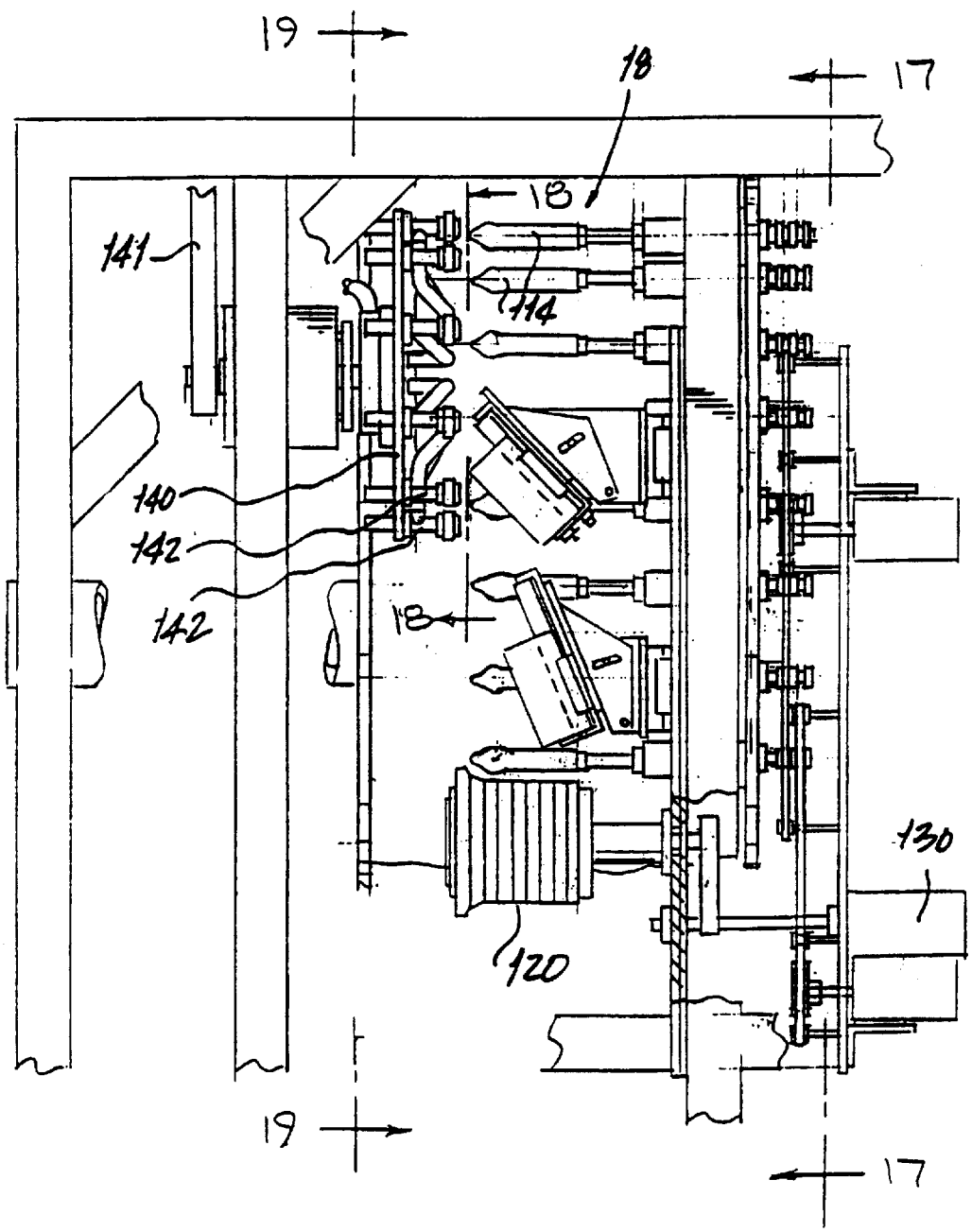
FIG. 16 is a right side view of the mandrel assembly, the two take-off rollers, the test roller and the sorter assembly.
Figure 17:
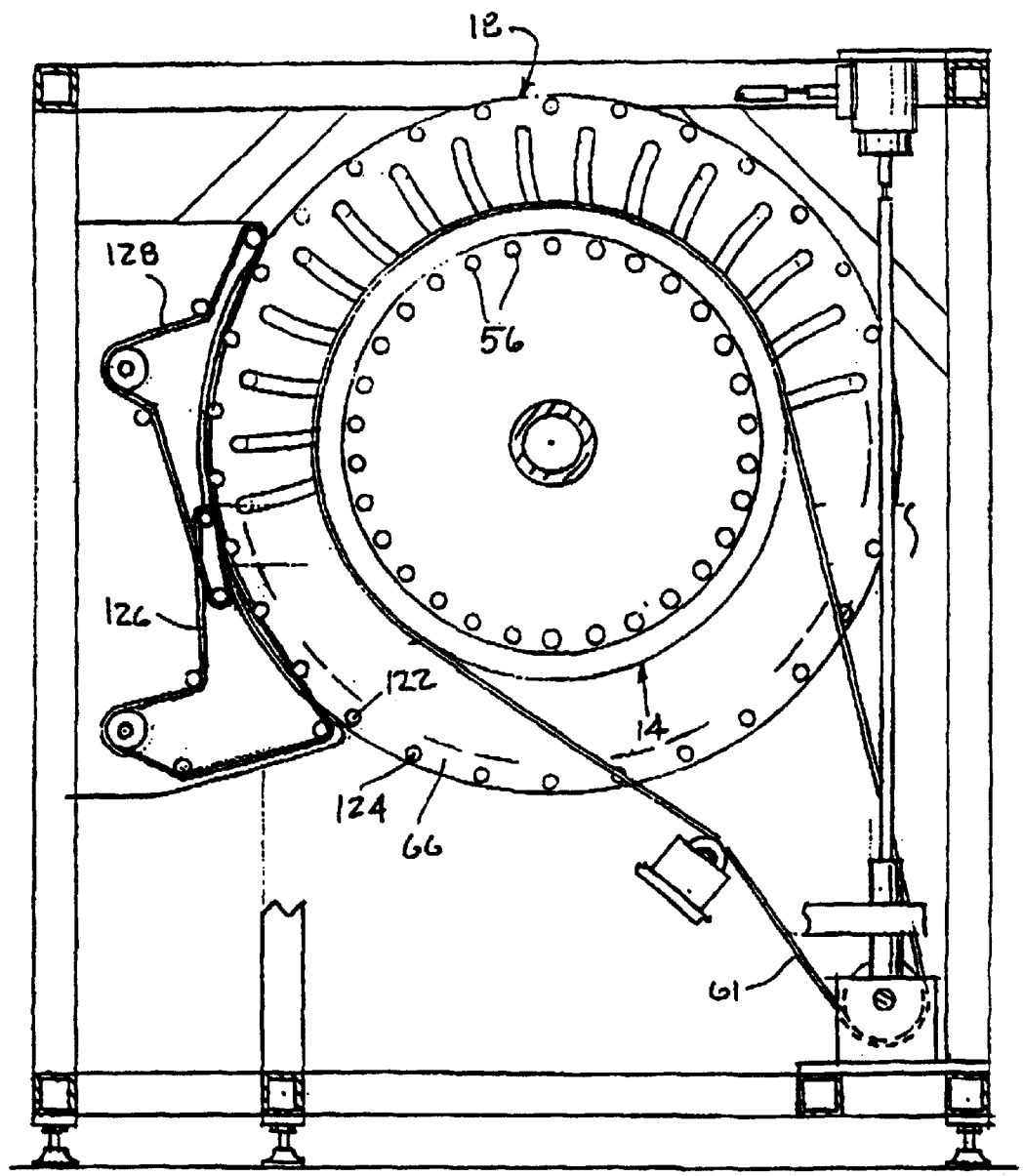
FIG. 17 is a cross-sectional view taken along line 17—17 and FIG. 16 and looking in the direction of the arrows.
Figure 18:
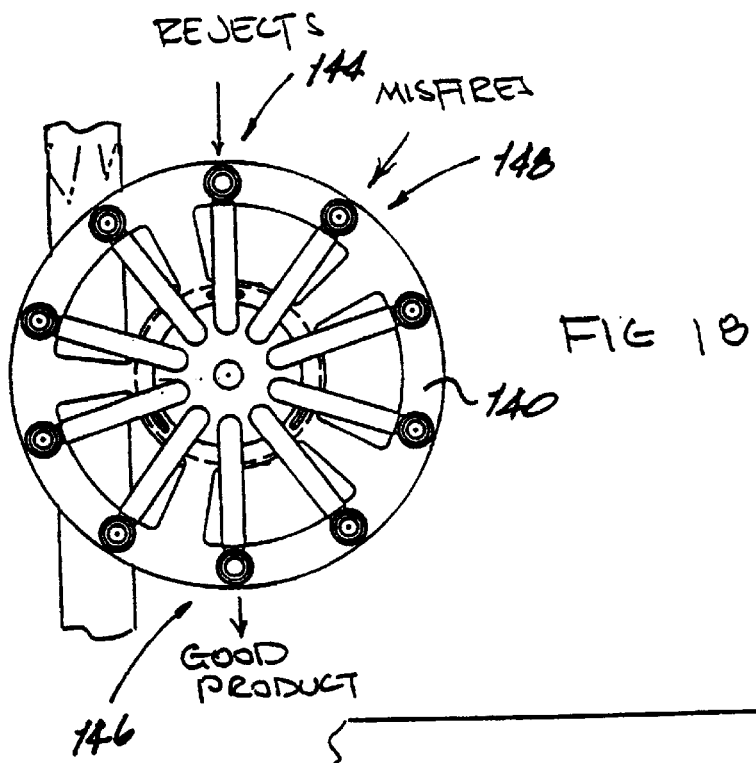
FIG. 18 is a cross-sectional view taken along line 18—18 of FIG. 16 and looking in the direction of the arrows.
Figure 19:
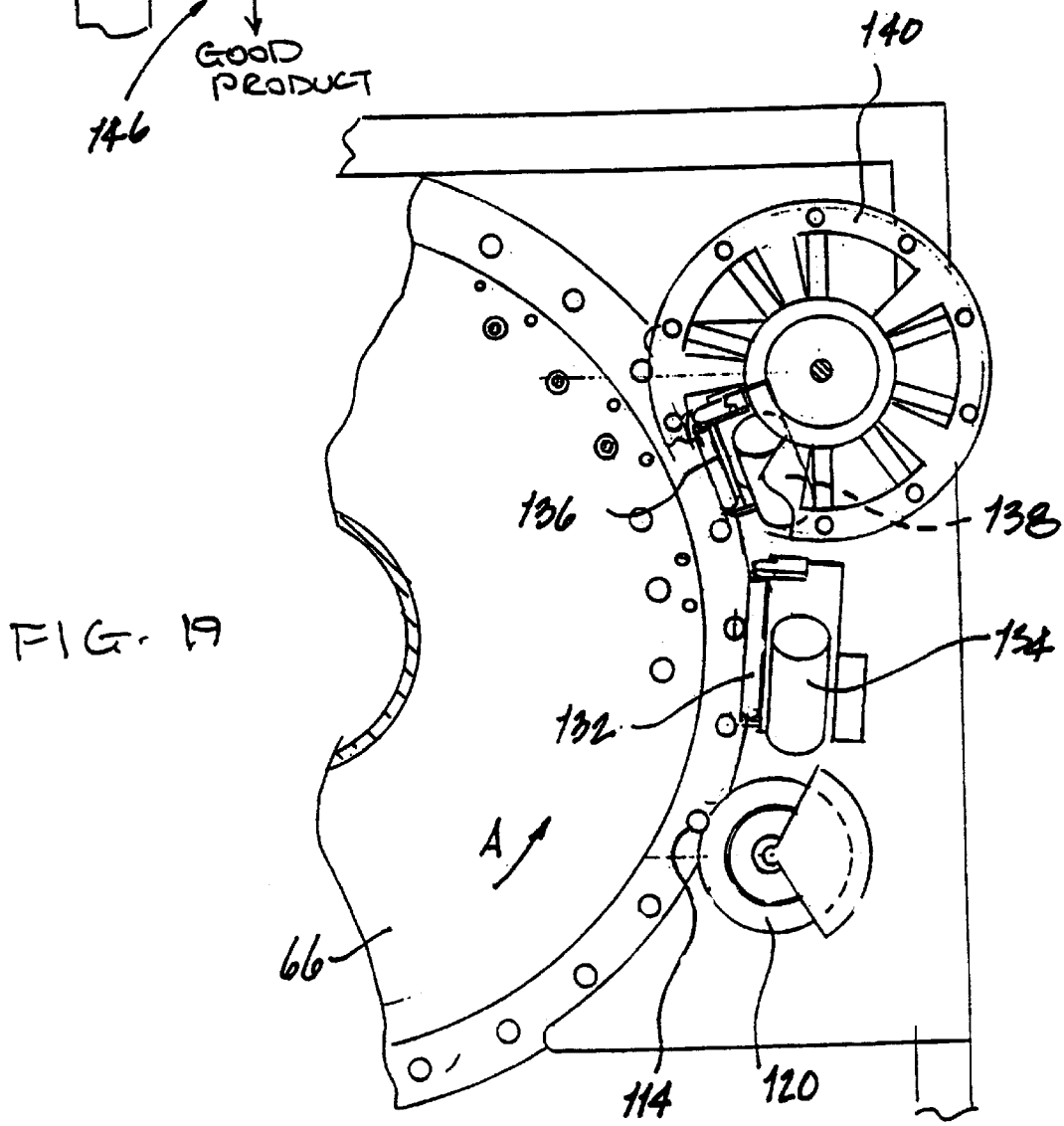
FIG. 19 is a cross-sectional view taken along line 19—19 of FIG. 16 and looking in the direction of the arrows.

Disk 66 continues to rotate in the direction indicated by arrow A in FIG. 19 towards a first take-off roller 132, which is driven by a motor 134. First take-off roller 132 rolls the condom 24 approximately half way up from its open ring end. A second take-off roller 136, which is driven by motor 138, completely removes condom 24 from mandrel 114 and places it in a sorter assembly 20. Sorter 20 includes a rotatable sorter wheel 140 that has a plurality of sorter cups 142 mounted thereon. Sorter wheel 140 is rotatably driven by motor 22 via belt drive 141 (see FIG. 16). Each sorter cup 142 has a vacuum applied thereto to hold the condom to the tube for as long as needed. After receiving a rolled up condom 24, the sorter cup 142 rotates and selectively releases the condom from the sorter cup 142 at a predetermined station, depending upon the results of the testing from test roller 120. For example, as illustrated in FIG. 18, the sorter wheel 140 will release the rolled up condom 24 at a first station 144 if the condom is determined to be a bad product, at a second station 146 if the condom is determined to be a good product and at a third station 148 if the condom is determined to be a misfire. The rejects are simply discarded or recycled. The misfires can be returned to the inflation tub (if any condom exists), and the good products are forwarded to a packaging facility, preferably by a conveyor belt. The rejects and misfires are released from the sorter by a separate source of air (not shown) that override the prevailing vacuum and blows the condom from the sorter tube. However, because blowing the condom may cause it to unroll, the good product are released from the sorter cup by simply cutting off the vacuum applied to the sorter tube. If needed, the sorter cup may also pass by a stationary arm, which acts as a plow, to remove the rolled up condom from the sorter tube at second station 146. Thus, the good product gently falls away from sorter cup 142 at second station 146.

Having described the presently preferred exemplary embodiment of a method and apparatus for automatically electronically testing condoms in accordance with the present invention, it is believed that other modifications, variations and changes will be suggested to those skilled in the art in view of the teachings set forth herein. It is, therefore, to be understood that all such modifications, variations, and changes are believed to fall within the scope of the present invention as defined by the appended claims.

What is claimed is:

1. An apparatus for automatically electronically testing condoms comprising:

an inflation tub having an internal chamber for housing a plurality of condoms;

a jug assembly having a plurality of jugs, each of said jugs having means for receiving a condom from said inflation tub;

a mandrel assembly having a plurality of mandrels, each of said mandrels receiving a condom from one of said jugs to electronically test said condom;

a plurality of pick up tubes being mounted on a rotating disk, each of said pick up tubes being connected to a loading tube, and a rotating plate on which said plurality of loading tubes are mounted, a plurality of shafts being connected between said rotating plate mounting said loading tubes and a rotating plate which each of said jugs is pivotably mounted to.

2. The apparatus according to claim 1, further comprising a sorter wheel having a plurality of sorter tubes mounted thereon, each of said sorter tubes receiving a condom from one of said mandrels.

3. The apparatus according to claim 1, wherein said inflation tub includes a rotatable housing that defines said internal chamber.

4. The apparatus according to claim 3, wherein said housing includes at least one inlet port to permit the circulation of air into said chamber, thereby creating an air flow within said chamber that generally flows from a lower portion thereof to an upper portion thereof.

5. The apparatus according to claim 4, further comprising an agitator being rotatably mounted within said chamber to prevent said condoms from bunching up within said chamber.

6. The apparatus according to claim 5, further comprising a plurality of cylinders connected to an upper wall of said housing.

7. The apparatus according to claim 6, wherein said cylinders each have an open bottom end to receive a condom floating within said chamber.

8. The apparatus according to claim 7, further comprising a plurality of rotating pivoting blocks connected to an exterior portion of said upper wall of said housing.

9. The apparatus according to claim 8, wherein each one of said blocks corresponds to one of said cylinders.

10. The apparatus according to claim 7, wherein an internal surface of said cylinder gradually tapers to an open upper end opening.

11. The apparatus according to claim 9, wherein each one of said blocks includes a flow path that selectively communicates with one of said cylinders and said chamber, said flow path within said block continuously communicates with a fixed vacuum ring.

12. The apparatus according to claim 11, wherein said block pivots between a load position and an unload position, in said load position said block is in contact with said upper wall of said housing, in said unload position, said block is pivoted upwardly and is spaced from said upper surface of said housing.

13. The apparatus according to claim 12, further comprising a plurality of pick up tubes being mounted on a rotating disk.

14. The apparatus according to claim 13, wherein one of said pick up tubes is aligned with the space between said block and said upper surface of said housing when said block is in the unload position.

15. The apparatus according to claim 1, wherein each of said jugs pivotably moves between a loading position and a transport position.

16. The apparatus according to claim 15, wherein each of said loading tubes have an open end remote from said pick up tube, said open end of said loading tube being aligned with one of said jugs when said jug is pivoted into a loading position.

17. The apparatus according to claim 1, wherein each of said jugs pivotably moves between a loading position and a transport position.

18. The apparatus according to claim 1, further comprising a finger assembly being slidably mounted on two of said shafts.

19. The apparatus according to claim 18, wherein said finger assembly housing includes at least one set of fingers that move between a radially inward position and a radially outward position.

20. The apparatus according to claim 19, wherein in the radially outward position, said at least one set of fingers engages a condom ring.

21. The apparatus according to claim 20, wherein said finger assembly is axially moveable, when said fingers are in a radially outward position to mount a condom onto one of said mandrels.

22. The apparatus according to claim 1, wherein each of said mandrels includes a first pulley and a second pulley fixedly connected thereto.

23. The apparatus according to claim 22, wherein said first pulley is selectively engaged by a belt to rotatably drive said mandrel at a first rotational speed.

24. The apparatus according to claim 23, wherein said second pulley is selectively engaged by a second belt to rotatably drive said mandrel at a second rotatable speed.

25. The apparatus according to claim 24, further comprising a test roll, wherein said mandrel shaft passes by said test roll to electronically test said condom.

26. The apparatus according to claim 25, further comprising a first take off roller to roll a condom approximately half way up on said mandrel.

27. The apparatus according to claim 26, further comprising a sorter wheel having a plurality of sorter tubes mounted thereon, each of said sorter tubes receiving a condom from one of said mandrels, further comprising a second take off roller to completely remove the partially rolled up condom from said mandrel and place said rolled up condom in one of said sorter tubes.

28. The apparatus according to claim 27, wherein said sorter wheel is rotatable, said sorter tube selectively releases said rolled up condom from said sorter tube to a predetermined station in dependence upon the results of the testing from said test roller.

29. An apparatus for automatically electronically testing condoms comprising:

an inflation tub having an internal chamber for housing a plurality of condoms;

a jug assembly having a plurality of jugs, each of said jugs having means for receiving a condom from said inflation tub;

a mandrel assembly having a plurality of mandrels, each of said mandrels receiving a condom from one of said jugs to electronically test said condom;

wherein said inflation tub includes a rotatable housing that defines said internal chamber, said housing includes at least one inlet port to permit the circulation of air into said chamber, thereby creating an air flow within said chamber that generally flows from a lower portion thereof to an upper portion thereof, further comprising an agitator being rotatably mounted within said chamber to prevent said condoms from bunching up within said chamber; a plurality of cylinders connected to an upper wall of said housing; and said cylinders each having an open bottom end to receive a condom floating within said chamber; a plurality of rotating pivoting blocks connected to an exterior portion of said upper wall of said housing, each one of said blocks corresponding to one of said cylinders, each one of said blocks including a flow path that selectively communicates with one of said cylinders and said chamber, said flow path within said block continuously communicating with a fixed vacuum ring; said block pivots between a load position and an unload position, in said load position said block is in contact with said upper wall of said housing, in said unload position, said block is pivoted upwardly and is spaced from said upper surface of said housing.

* * * * *